US011656657B2

(12) United States Patent
Therien et al.

(10) Patent No.: US 11,656,657 B2
(45) Date of Patent: May 23, 2023

(54) BENDABLE AND FOLDABLE DISPLAY SCREEN TO PROVIDE CONTINUOUS DISPLAY

(71) Applicant: Intel Corporation, Santa Clara, CA (US)

(72) Inventors: Guy M. Therien, Beaverton, OR (US); David W. Browning, Portland, OR (US); Joshua L. Zuniga, Damascus, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/537,271

(22) Filed: Nov. 29, 2021

(65) Prior Publication Data
US 2022/0197344 A1 Jun. 23, 2022

Related U.S. Application Data

(63) Continuation of application No. 15/777,559, filed as application No. PCT/US2015/000395 on Dec. 26, 2015, now Pat. No. 11,188,127.

(51) Int. Cl.
G06F 3/14 (2006.01)
G06F 3/038 (2013.01)
G06F 1/16 (2006.01)

(52) U.S. Cl.
CPC .......... G06F 1/1652 (2013.01); G06F 1/1641 (2013.01); G06F 3/038 (2013.01);
(Continued)

(58) Field of Classification Search
CPC .......... G06F 3/038; G06F 3/14; G06F 3/0483; G06F 1/1652; G06F 1/1641;
(Continued)

(56) References Cited

U.S. PATENT DOCUMENTS 6,115,025 A 9/2000 Buxton et al.
7,091,926 B2 8/2006 Kulas
(Continued)

FOREIGN PATENT DOCUMENTS

CN 103477304 A 12/2013
KR 20110055718 A 5/2011
(Continued)

OTHER PUBLICATIONS

International Searching Authority, "International Search Report of the International Searching Authority," issued in connection with International Application No. PCT/US2015/000395, dated Aug. 24, 2016, 3 pages.
(Continued)

Primary Examiner — Vijay Shankar
(74) Attorney, Agent, or Firm — Hanley, Flight & Zimmerman, LLC

(57) ABSTRACT

Embodiments are generally directed to a flexible overlapping display. An embodiment of a mobile device includes a processor to process data for the mobile device, a bendable and foldable display screen, one or more device sensors to sense an orientation of the mobile device, and one or more display sensors to sense a current arrangement of the display screen. The processor is to identify one or more portions of the display screen that are visible to a user based at least in part on data from the one or more device sensors and the one or more display sensors.

21 Claims, 13 Drawing Sheets

(52) U.S. Cl.
CPC .............. *G06F 3/14* (2013.01); *G06F 3/1446* (2013.01); *G06F 2200/1637* (2013.01); *G09G 2380/02* (2013.01)

(58) Field of Classification Search
CPC .......... G06F 3/1446; G06F 2200/1637; G09G 2320/0261; G09G 2354/00; G09G 2380/02
See application file for complete search history.

(56) References Cited

U.S. PATENT DOCUMENTS

| | | | |
|---|---|---|---|
| 7,782,274 | B2 | 8/2010 | Manning |
| 7,787,917 | B2 | 8/2010 | Aoki et al. |
| 8,170,631 | B2 | 5/2012 | Aoki et al. |
| 8,259,080 | B2 | 9/2012 | Casparian et al. |
| 8,508,433 | B2 | 8/2013 | Manning |
| 8,669,918 | B2 | 3/2014 | Manning |
| 8,803,816 | B2 | 8/2014 | Kilpatrick, II et al. |
| 8,825,121 | B2 | 9/2014 | Aoki et al. |
| 8,836,611 | B2 | 9/2014 | Kilpatrick, II et al. |
| 8,860,632 | B2 | 10/2014 | Kilpatrick, II et al. |
| 8,860,765 | B2 | 10/2014 | Kilpatrick, II et al. |
| 8,863,038 | B2 | 10/2014 | King et al. |
| 8,866,840 | B2 | 10/2014 | Dahl et al. |
| 8,872,729 | B2 | 10/2014 | Lyons et al. |
| 8,907,864 | B2 | 12/2014 | Manning |
| 8,933,874 | B2 | 1/2015 | Lundqvist et al. |
| 8,947,320 | B2 | 2/2015 | King et al. |
| 8,970,449 | B2 | 3/2015 | Manning |
| 9,009,984 | B2 | 4/2015 | Caskey et al. |
| 9,122,249 | B2 | 9/2015 | Lyons et al. |
| 9,250,851 | B2 | 2/2016 | Lu et al. |
| 9,489,080 | B2 | 11/2016 | Seo et al. |
| 9,684,342 | B2 | 6/2017 | Kim et al. |
| 10,114,481 | B2 | 10/2018 | Magi et al. |
| 11,079,867 | B2 * | 8/2021 | Jiang .................. G06F 3/04883 |
| 11,127,321 | B2 * | 9/2021 | Klein .................... G06F 3/0481 |
| 11,138,912 | B2 * | 10/2021 | Klein .................... G06F 3/0481 |
| 11,138,949 | B2 * | 10/2021 | Iyer ....................... G06F 1/1677 |
| 11,188,127 | B2 | 11/2021 | Therien et al. |
| 11,294,486 | B2 * | 4/2022 | Jiang ..................... G06F 1/1641 |
| 2003/0151562 | A1 | 8/2003 | Kulas |
| 2007/0285341 | A1 | 12/2007 | Manning |
| 2008/0158795 | A1 | 7/2008 | Aoki et al. |
| 2009/0244016 | A1 | 10/2009 | Casparian et al. |
| 2010/0060664 | A1 | 3/2010 | Kilpatrick, II et al. |
| 2010/0064244 | A1 | 3/2010 | Kilpatrick, II et al. |
| 2010/0064536 | A1 | 3/2010 | Caskey et al. |
| 2010/0066643 | A1 | 3/2010 | King et al. |
| 2010/0079355 | A1 | 4/2010 | Kilpatrick, II et al. |
| 2010/0085274 | A1 | 4/2010 | Kilpatrick, II et al. |
| 2010/0085382 | A1 | 4/2010 | Lundqvist et al. |
| 2010/0182265 | A1 | 7/2010 | Kim et al. |
| 2010/0207844 | A1 | 8/2010 | Manning |
| 2010/0289730 | A1 | 11/2010 | Aoki et al. |
| 2011/0126141 | A1 | 5/2011 | King et al. |
| 2011/0216064 | A1 | 9/2011 | Dahl et al. |
| 2011/0241973 | A1 | 10/2011 | Manning |
| 2011/0241974 | A1 | 10/2011 | Manning |
| 2012/0084722 | A1 | 4/2012 | Cassar et al. |
| 2012/0162049 | A1 | 6/2012 | Aoki et al. |
| 2012/0188153 | A1 | 7/2012 | Tziortzis et al. |
| 2012/0242599 | A1 | 9/2012 | Seo et al. |
| 2012/0280924 | A1 | 11/2012 | Kummer et al. |
| 2012/0299813 | A1 | 11/2012 | Kang et al. |
| 2012/0299845 | A1 | 11/2012 | Seo et al. |
| 2012/0306782 | A1 | 12/2012 | Seo et al. |
| 2013/0083496 | A1 | 4/2013 | Franklin et al. |
| 2013/0120912 | A1 | 5/2013 | Ladouceur et al. |
| 2013/0271350 | A1 | 10/2013 | Lyons |
| 2013/0271351 | A1 | 10/2013 | Lyons et al. |
| 2013/0271355 | A1 | 10/2013 | Lyons et al. |
| 2013/0271389 | A1 | 10/2013 | Lyons et al. |
| 2013/0271390 | A1 | 10/2013 | Lyons et al. |
| 2013/0271392 | A1 | 10/2013 | Lyons |
| 2013/0271495 | A1 | 10/2013 | Nguyen et al. |
| 2013/0321340 | A1 | 12/2013 | Seo et al. |
| 2013/0342439 | A1 | 12/2013 | Kwack et al. |
| 2013/0342483 | A1 | 12/2013 | Seo et al. |
| 2014/0049450 | A1 | 2/2014 | Manning |
| 2014/0062856 | A1 | 3/2014 | Lu et al. |
| 2014/0101579 | A1 | 4/2014 | Kim et al. |
| 2015/0009128 | A1 | 1/2015 | Matsumoto |
| 2015/0309691 | A1 | 10/2015 | Seo et al. |
| 2015/0378395 | A1 | 12/2015 | Manning |
| 2015/0378503 | A1 | 12/2015 | Seo et al. |
| 2016/0147362 | A1 | 5/2016 | Eim et al. |
| 2016/0321969 | A1 | 11/2016 | Kambhatla |
| 2016/0372083 | A1 | 12/2016 | Taite et al. |
| 2017/0052698 | A1 | 2/2017 | Seo et al. |
| 2017/0185170 | A1 | 6/2017 | Magi et al. |
| 2020/0192432 | A1 | 6/2020 | Yee et al. |

FOREIGN PATENT DOCUMENTS

| | | |
|---|---|---|
| KR | 20140046319 A | 4/2014 |
| TW | 201024977 A | 7/2010 |
| TW | 201351206 A | 12/2013 |
| TW | 201351268 A | 12/2013 |
| TW | 201411419 A | 3/2014 |

OTHER PUBLICATIONS

International Searching Authority, "Written Opinion of the International Searching Authority," issued in connection with International Application No. PCT/US2015/000395, dated Aug. 24, 2016, 6 pages.

International Bureau, "International Preliminary Report on Patentability," issued in connection with International Patent Application No. PCT/US2015/000395, dated Jul. 5, 2018, 8 pages.

United States Patent and Trademark Office, "Non-Final Office Action," issued in connection with U.S. Appl. No. 15/777,559, dated Feb. 22, 2021, 7 pages.

United States Patent and Trademark Office, "Notice of Allowance and Fee(s) Due," issued in connection with U.S. Appl. No. 15/777,559, dated Jul. 20, 2021, 7 pages.

International Searching Authority, "International Search Report and Written Opinion," issued in connection with PCT Application No. PCT/2016/019920, dated Jun. 8, 2016, 15 pages.

Taiwanese Patent Office, "IPO Search Report," issued in connection with Taiwan Patent Application No. 105109009, dated Apr. 13, 2017, 2 pages.

United States Patent and Trademark Office, "Restriction Requirement," issued in connection with U.S. Appl. No. 14/751,684, dated Jun. 30, 2016, 15 pages.

United States Patent and Trademark Office, "Non-Final Office Action," issued in connection with U.S. Appl. No. 14/751,684, dated Oct. 6, 2016, 17 pages.

United States Patent and Trademark Office, "Final Office Action," issued in connection with U.S. Appl. No. 14/751,684, dated Aug. 1, 2019, 17 pages.

United States Patent and Trademark Office, "Non-Final Office Action," issued in connection with U.S. Appl. No. 14/751,684, dated Sep. 17, 2019, 17 pages.

United States Patent and Trademark Office, "Final Office Action," issued in connection with U.S. Appl. No. 14/751,684, dated Mar. 18, 2020, 10 pages.

United States Patent and Trademark Office, "Ex Parte Quayle," issued in connection with U.S. Appl. No. 14/751,684, dated May 2, 2022, 9 pages.

United States Patent and Trademark Office, "Notice of Allowance and Fee(s) Due," issued in connection with U.S. Appl. No. 14/751,684, dated Aug. 31, 2022, 11 pages.

International Bureau, "International Preliminary Report on Patentability," issued in connection with PCT Application No. PCT/US2016/019920, dated Oct. 31, 2017, 8 pages.

(56) References Cited

OTHER PUBLICATIONS

United States Patent and Trademark Office, "Examiner's Answer to Appeal Brief," issued in connection with U.S. Appl. No. 14/751,684, dated Oct. 1, 2020, 15 pages.

United States Patent and Trademark Office, "Decision on Appeal," issued in connection with U.S. Appl. No. 14/751,684, dated Apr. 11, 2022, 7 pages.

Korean Patent Office, "Office Action," issued in connection with Korean Patent Application No. 10-2016-0034799, dated Jul. 28, 2017, 13 pages (English translation included).

Korean Patent Office, "Written Decision on Registration," issued in connection with Korean Patent Application No. 10-2016-0034799, dated Nov. 9, 2017, 4 pages (English translation included).

Taiwanese Patent Office, "Allowance Decision of Examination," issued in connection with Taiwanese Patent Application No. 105109009, dated Aug. 28, 2017, 2 pages.

United States Patent and Trademark Office, "Notice of Allowance and Fee(s) Due," issued in connection with U.S. Appl. No. 14/751,684, dated Feb. 8, 2023, 10 pages.

United States Patent and Trademark Office, "Supplemental Notice of Allowability," issued in connection with U.S. Appl. No. 14/751,684, dated Feb. 22, 2023, 2 pages.

\* cited by examiner

BENDABLE AND FOLDABLE DISPLAY SCREEN TO PROVIDE CONTINUOUS DISPLAY

RELATED APPLICATIONS

This patent arises from a continuation of U.S. patent application Ser. No. 15/777,559, now U.S. Pat. No. 11,188,127, which was filed on May 18, 2018. U.S. patent application Ser. No. 15/777,559 is a national stage application under 35 U.S.C. § 371 of International Patent Application No. PCT/US2015/000395, which was filed on Dec. 26, 2015. U.S. patent application Ser. No. 15/777,559 and International Patent Application No. PCT/US2015/000395 are hereby incorporated herein by reference in their entireties. Priority to U.S. patent application Ser. No. 15/777,559 and International Patent Application No. PCT/US2015/000395 is hereby claimed.

TECHNICAL FIELD

Embodiments described herein generally relate to the field of electronic devices and, more particularly, to a bendable and foldable display screen to provide a continuous display.

BACKGROUND

Mobile devices with electronic displays, such as tablet computers, electronic book readers, and smartphones, are increasingly used for reading books, periodicals, and other written documents.

In reading such documents, the conventional user interaction when reading a document is to require the user to either to press certain control buttons or to provide certain gestures, such as a swipe across the display in certain direction, to move from one page or section to the next (or previous) page of section.

However, among newer technologies are bendable and foldable displays in which a display may be folded or otherwise changed in arrangement. While such displays have great promise for many purposes, the conventional control structure for document reading and other applications is not as well suited for a bendable and foldable display as for conventional displays.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Figure 1:
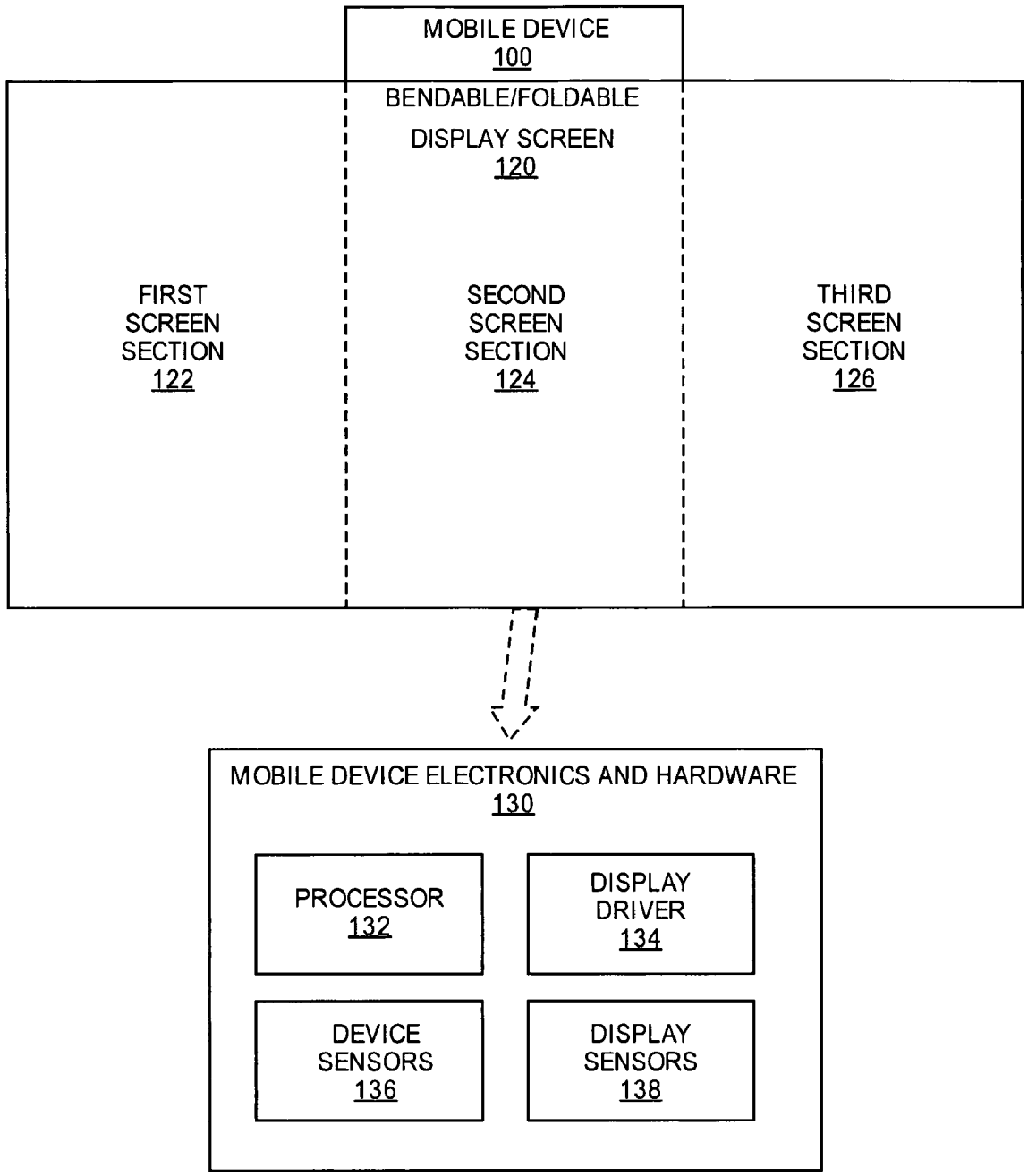
FIG. 1 is an illustration of a mobile device with a bendable and foldable display screen according to an embodiment.

Embodiments described herein are generally directed to a bendable and foldable display screen to provide continuous display.

For the purposes of this description:

"Mobile electronic device" or "mobile device" means a smartphone, smartwatch, tablet computer, electronic book ready, notebook or laptop computer, handheld computer, mobile Internet device, wearable technology, or other mobile electronic device that includes processing capability.

"Sensor" means a mechanism to detect conditions, events, or changes in an environment and to produce a resulting output, wherein the output may be referred to as sensor data, sensing data, or similar terms. The output of a sensor may include, but is not limited to, electrical and optical signals. Conditions, events, and changes in an environment may include, but are limited to, light (luminosity), sound, motion, and acceleration.

In some embodiments, an apparatus or system includes a bendable and foldable display screen. In some embodiments, portions of the display screen are overlapping or wrappable in relation to each other. In some embodiments, the apparatus or system is operable to determine an orientation of the apparatus or system and a display screen arrangement, identify one or more portions of the display screen that are visible to a user, and to format data for display on the one or more visible portions of the display screen. In some embodiments, the display screen is operable to provide a continuous display as the display screen is folded, unfolded, and turned. Stated in another way, the display screen is operable to provide continuous (or infinite) display in rotation of the display screen.

With the advent of bendable and foldable displays, there is an opportunity to improve the reading experience for electronic documents by making the process more like reading a magazine, paper book, folded pamphlet, or bound document.

In some embodiments, a device includes a wraparound display screen that is bendable and foldable, wherein portions of the display may overlap behind the device or behind other portions of the display. In some embodiments, the display screen may include a flexible display surface, or may include display screen including multiple independent sections (such as rigid sections) that fold (or hinge) in relation to each other. In some embodiments, the device includes one or more sensors to sense an orientation of the device and one or more sensors to sense a current arrangement of the bendable and foldable display screen, wherein the current arrangement of the display screen includes whether any portion of the display is obscured by the device or by another portion of the bendable and foldable display screen.

In some embodiments, a device or an application (such as a reader application) is operable to utilize the sensor information to determine what to display and where to display. More specifically, a device or application is operable to receive the sensor information, determine the device orientation (including a direction in which the display is oriented) and display arrangement (including a determination of if and how the display screen is folded), identity one or more visible portions of the display, format data for the one or more visible portions of the display screen, and send the data to be displayed to the visible portions of the display screen.

In some embodiments, a device or application may, for example, be configured to display text as the device is rotated back to front and when a display screen is uncovered, thereby resulting in a continuous progression of display of the document material as the device is turned and portions of an overlapping display screen are folded (covered) or unfolded (uncovered). In this manner, the device provides a reading experience that is similar to that of a magazine or folded paper pamphlet, with the exception that when the last fold of the back page is viewed and the pamphlet is turned, new material starts on the front. In some embodiments, the device may provide continuous (or infinite) display of material as the device is rotated, which may include a continuous display of information in a first manner (such as moving forward in reading material) when the device is rotated in a first direction and a continuous display of information in a second manner (such as moving backwards in the reading material) when the device is rotated in a first direction. Further, different applications may have different configurations that cause the displays to be active, and different gestures may cause the displays to show different content.

FIG. 1 is an illustration of a mobile device with a bendable and foldable display screen according to an embodiment. As provided in FIG. 1, a mobile device 100 includes a foldable and bendable display screen 120. In this example, the display screen 120 includes three sections, the sections being illustrated as a first screen section 122 (a left section in this example), a second screen section 124 (a center section), and a third screen section 126 (a right section), where the sections are bendable and foldable in relation to each other. However, this is an example, and embodiments are not limited to this particular configuration.

In some embodiments, the mobile device 100 includes mobile device electronics 130. In some embodiments, the mobile device electronics include a processor 132 to process data, including data for display, a display driver 134 to drive signals for the bendable and foldable display screen 120, and sensors, wherein the sensors may include one or more device sensors 136 and one or more display sensors 138. However, embodiments are not limited to these particular sensors.

In some embodiments, the one or more device sensors 136 include one or more sensors to determine an orientation of the mobile device 100. For example, the one or mom device sensors 136 includes one or more sensors to determine which face of the device 100 is pointed upward, and the orientation of the upward face. In some embodiments, the device sensors 136 include, but are not limited to, one or more accelerometers or gyroscopes to determine orientation, including use of motion, gravity, and other forces. In some embodiments, the mobile device further includes one or more display sensors 138 to determine a current display arrangement, wherein the display sensors may include, but are not limited to, flap contact sensors, angle of opening sensors, light sensors, and stretchable, flexible, or bendable sensors to determine folding. The display sensors 138 may include one or more sensors to determine whether the display sensor is folded or unfolded, and in which direction and angle the display is folded. Further the sensors may be capable of determining if the sections of the display are overlapping, and which sections of the overlapping sections are not obscured by other elements, in one example, a display section may one or more sensors to detect whether the display section is not visible because it is underneath another section, including, for example, a light sensor, contact or pressure sensor, or motion sensor.

For example, in FIG. 1, if the display screen 120 is fully open (as shown in FIG. 1) and facing upward, the mobile device 100 may provide display on each of the three screen sections. If the first screen section 122 is folded behind, then the mobile device 100 may display data on the second screen section 124 and the third screen section 126, with the first screen section 122 being turned off. If the third screen section 126 is then folded behind the mobile device 100, the mobile device 100 may then provide data to only the second screen section 124, with the first and third screen sections being turned off. If the mobile device 100 is then inverted, the third section will face upward, and the device may provide data to only the third screen section 124, with the first and second screen sections being turned off.

In some embodiments, the mobile device 100 further detects a change in orientation or display arrangement, and utilizes this information in determining what data to display. In the example of the mobile device 100 in turning from the second screen section 124 to the folded over third screen section 126, the device may, in a particular example of a reading application (such as to read an electronic book), move forward to a next page of data (or, in general, provide succeeding data) when the mobile device 100 is turned in a first direction (such as lifting the right edge of the second semen section), and move backward to a previous page of data (or, in general, provide prior data) when the mobile device is turned in a second direction (such as lifting the left edge of the second screen section). However, embodiments are not limited to this particular operation, and may include other data operations depending on the application that is utilized on the mobile device.

FIGS. 2A to 2J illustrate operation of a mobile device with a bendable and foldable display screen according to an embodiment. FIGS. 2A to 2J illustrate configuration of a device in terms of the device's displays and orientation, including intermediate configurations that can result in a decision for software to display or not display, and determine how to display, images utilizing screen sections that are physically visible or nonvisible depending on the device orientation and the display screen. However, embodiments are not limited to the reader application that is illustrated in FIGS. 2A to 2J, and may include any application that provides multiple different data displays.

Figure 2A:
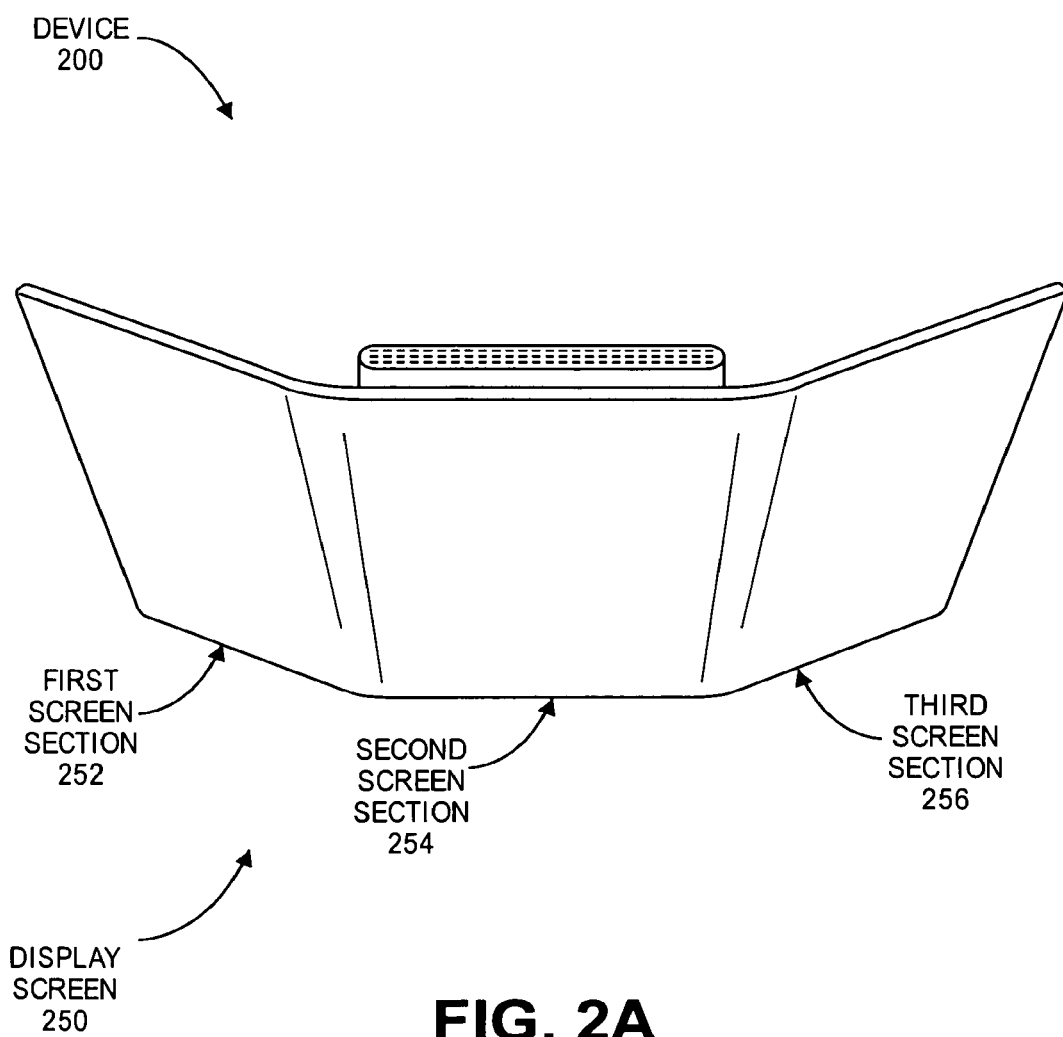
FIGS. 2A to 2J illustrate operation of a mobile device with a bendable and foldable display screen to provide continuous display according to an embodiment.

In some embodiments, a mobile device 200 with a bendable and foldable display screen 250, wherein the sections of the display screen may be wrappable or overlapping in relation to each other, may provide the following operations:

FIG. 2A: Illustrating device 200 with bendable and foldable display screen 250, wherein the display screen 250 is currently open, where the display screen may be viewed as having a first (left) screen section 252, a second (center) screen section 254, and a third (right) screen section 256.

Figure 2B:
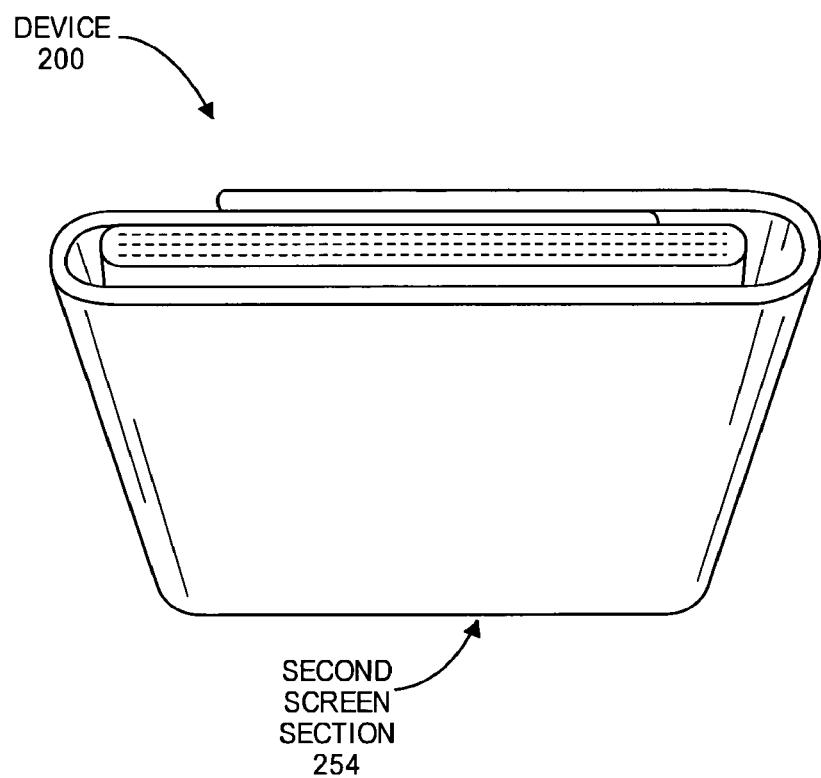

FIG. 2B: Device 200 is placed into a position in which the first screen section 252 and third screen section 256 are folded back such that the third screen section is folded over the first screen section 254, which may be referred to as a wrapped position.

Figure 2C:
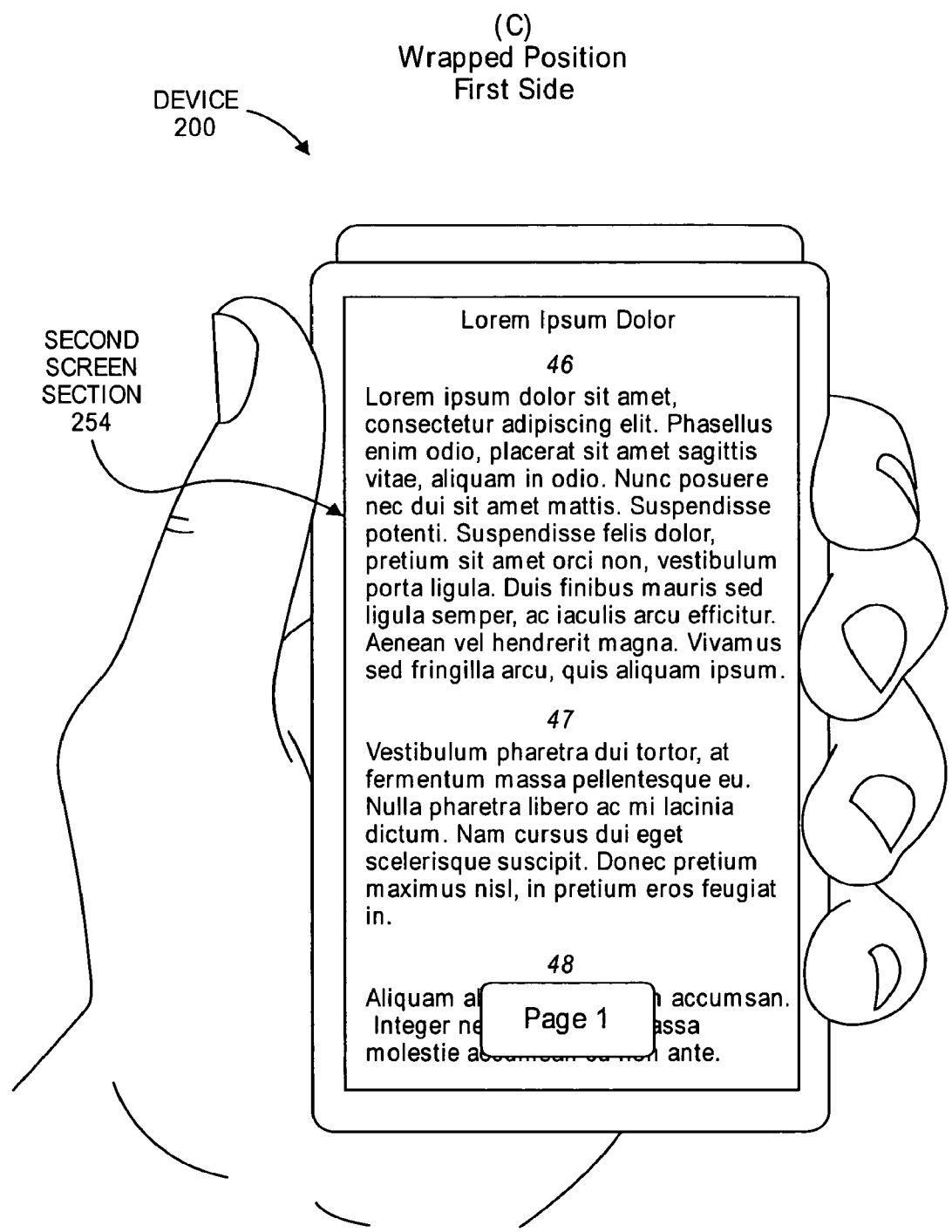

FIG. 2C: Viewing second screen section 254, with a first page being displayed.

Figure 2D:
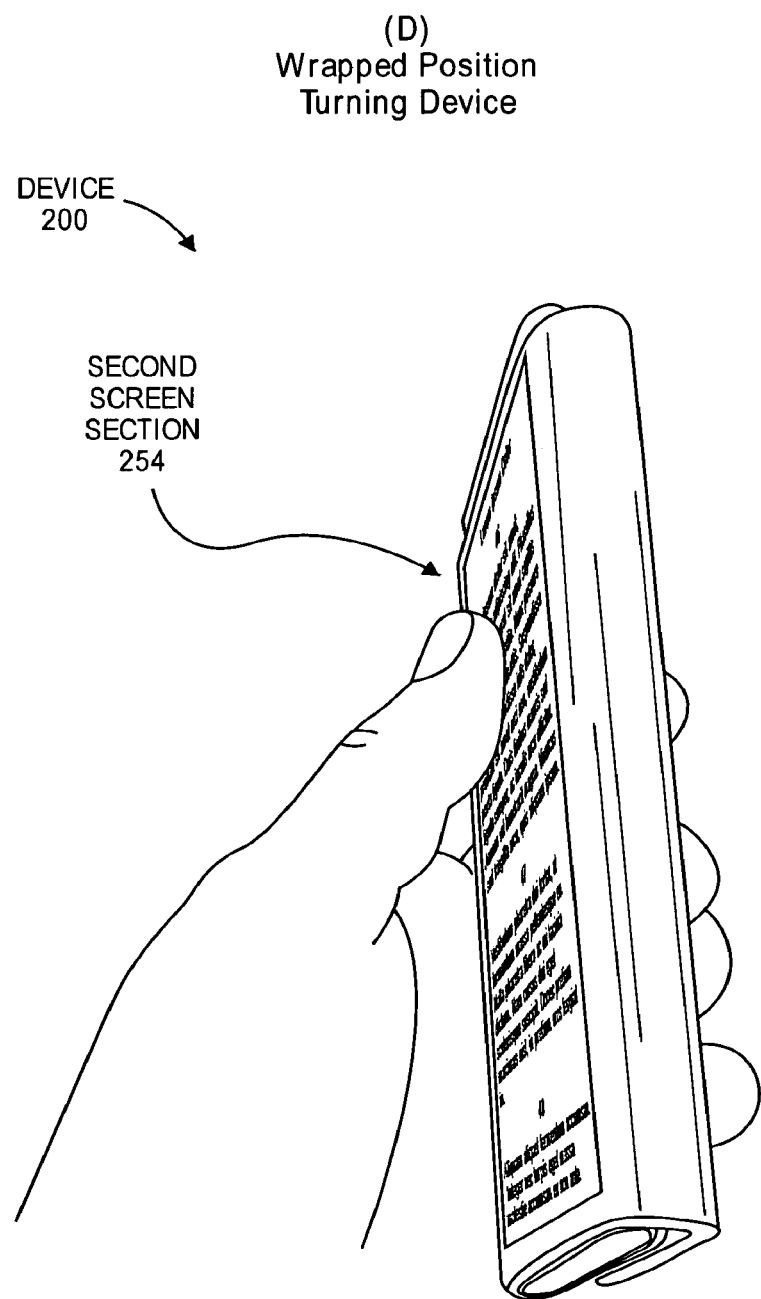

FIG. 2D: Turning the device 200 over to view the reverse side, with the second screen section 254 becoming nonvisible.

Figure 2E:
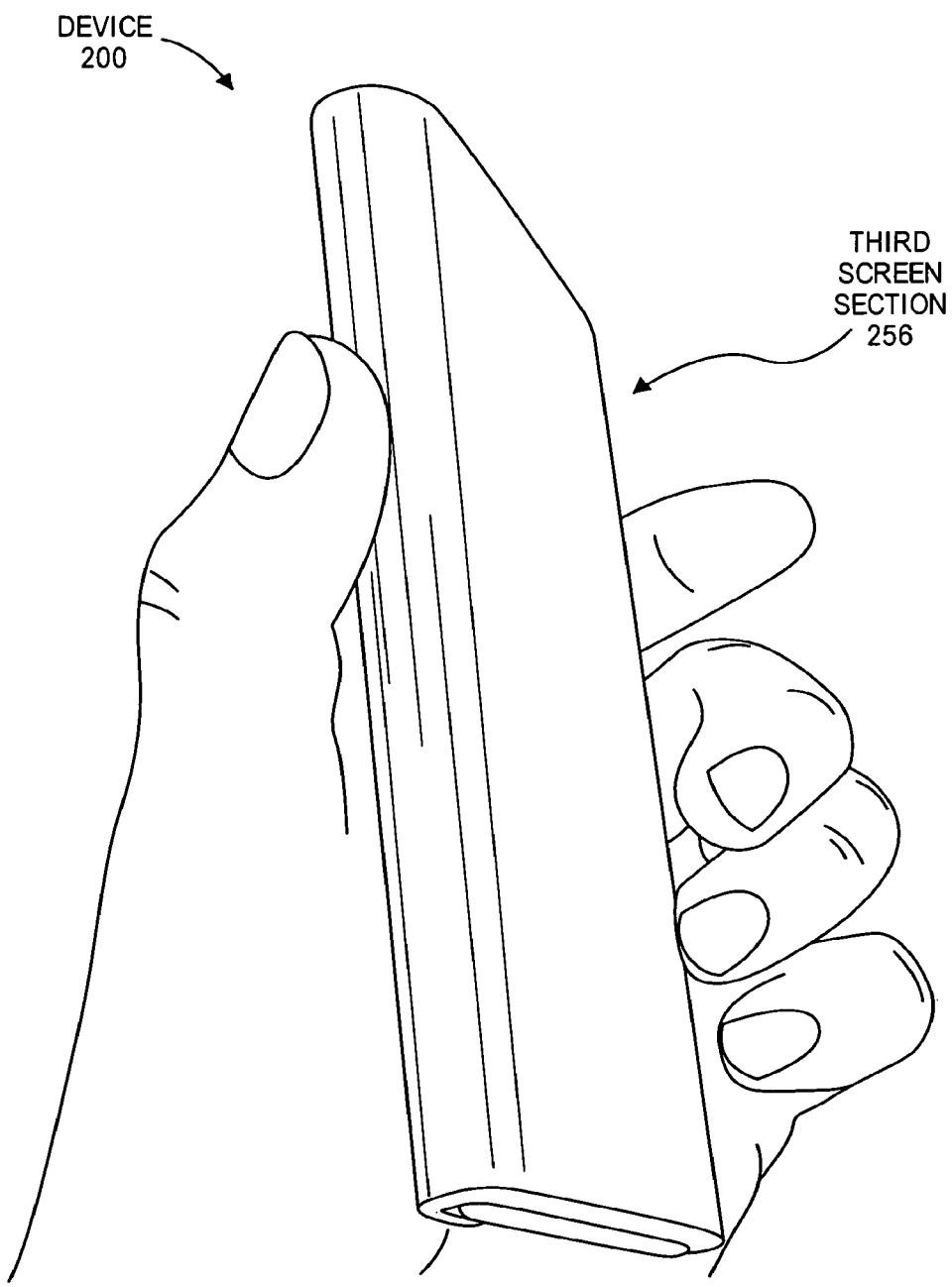

FIG. 2E: Further turning the device 200 over, with the third screen section 256 becoming visible.

Figure 2F:
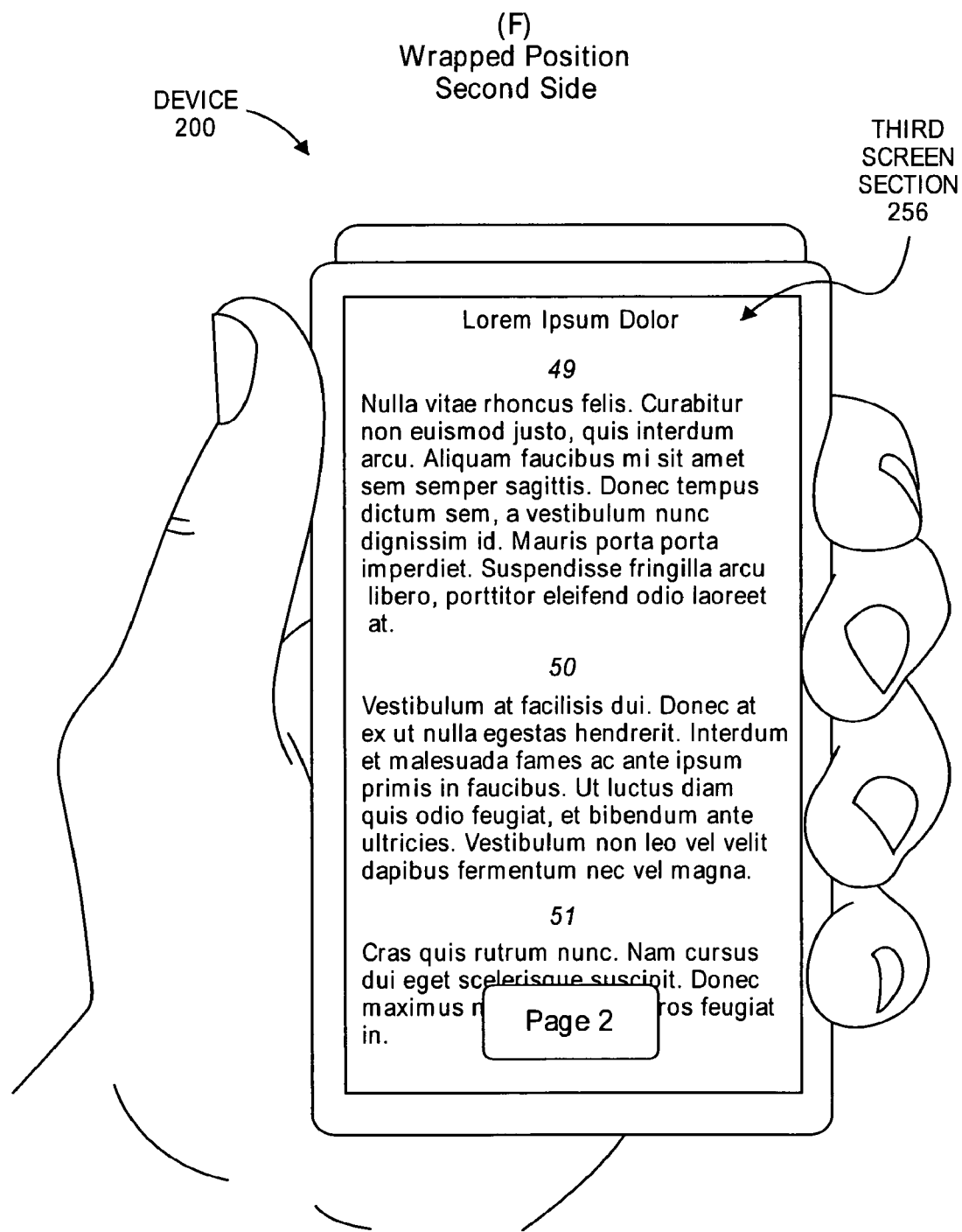

FIG. 2F: The third screen section 256 is visible, and a second page is displayed on the screen.

Figure 2G:
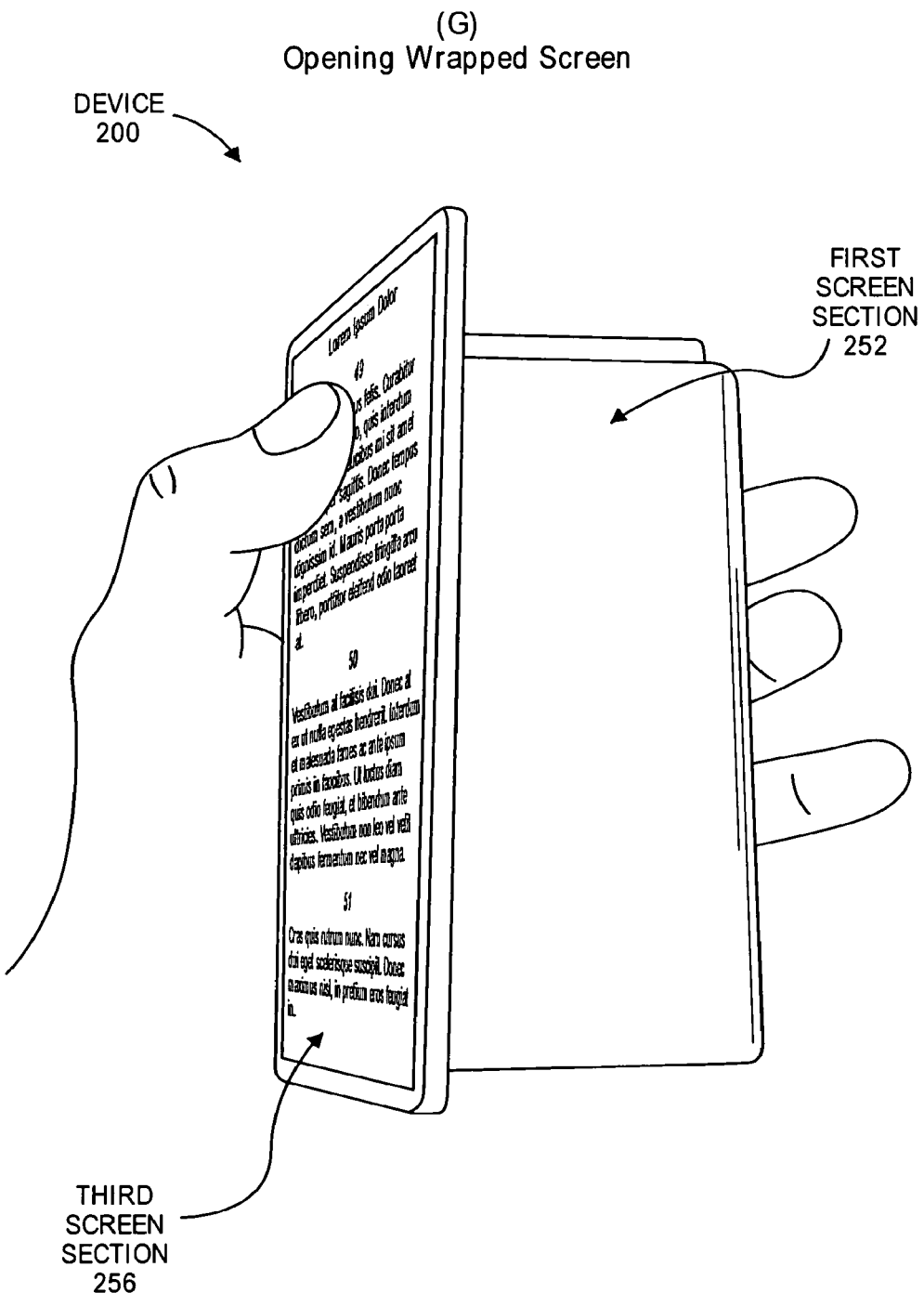

FIG. 2G: Opening the wrapped position of the display to turn the third screen section 256 away and make the first screen section 252 visible to the user.

Figure 2H:
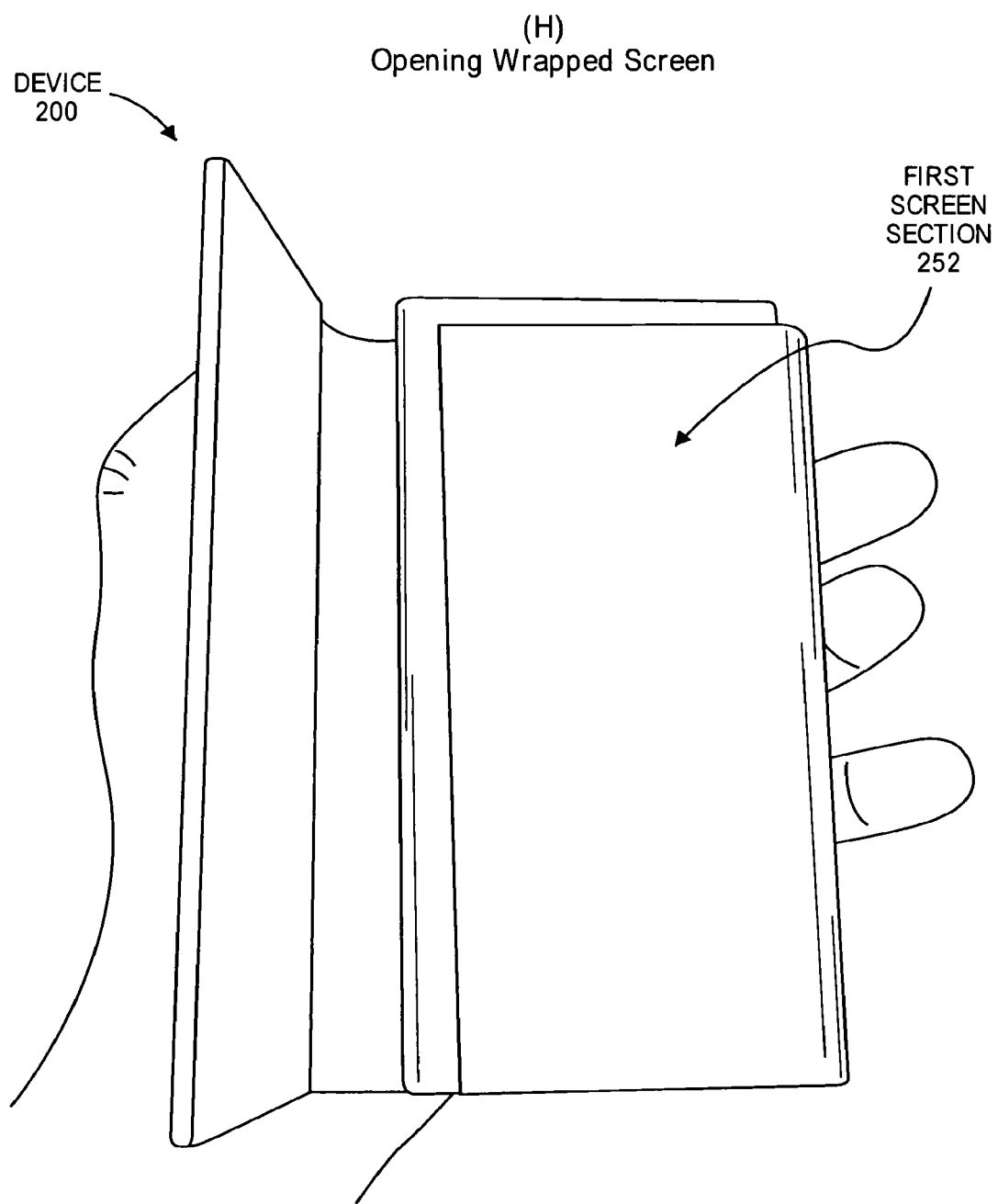

FIG. 2H: The first screen section 252 is now visible.

Figure 2I:
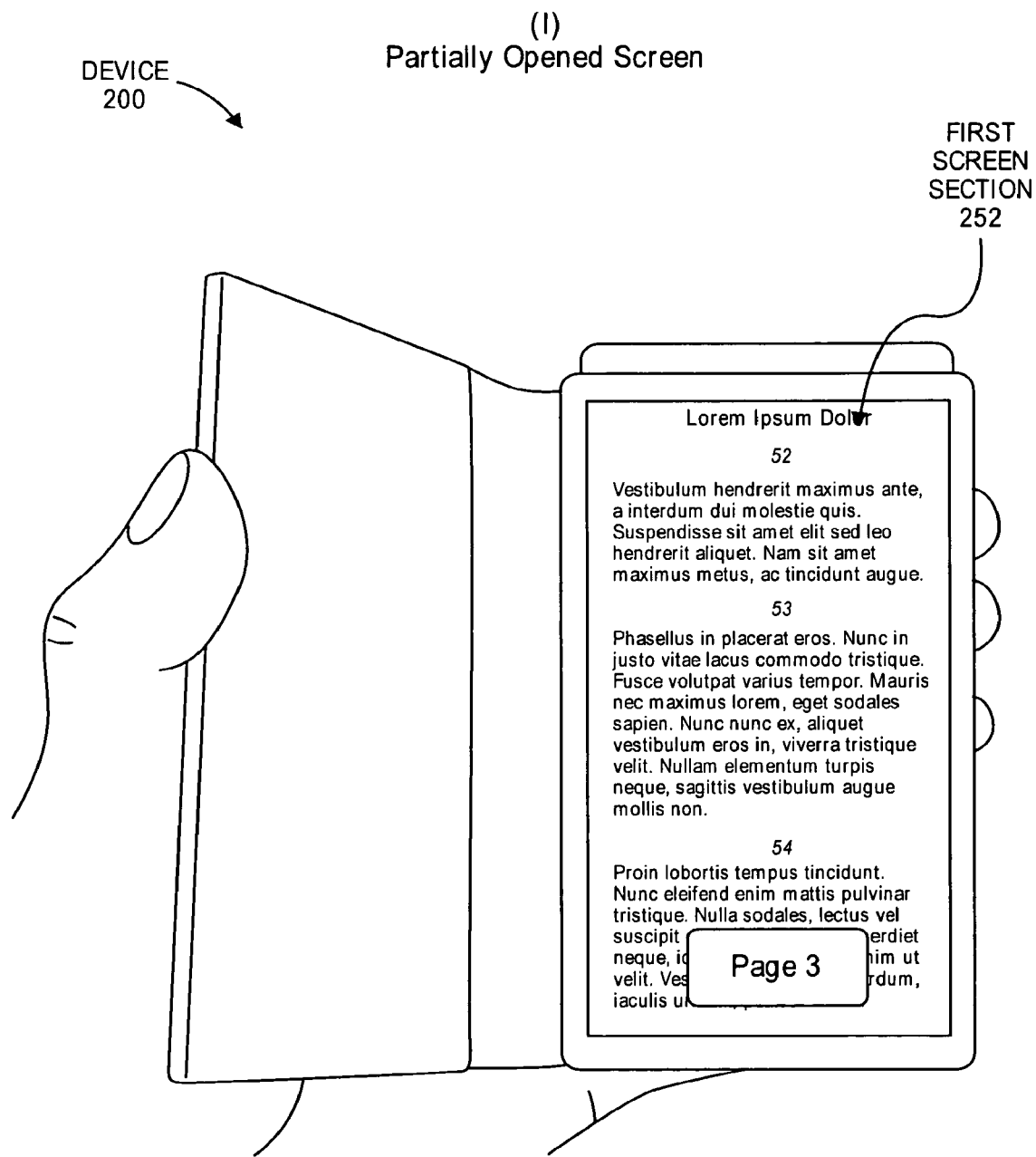

FIG. 2I: The device 200 is now displaying a third page of data on the now visible first screen section 252.

Figure 2J:
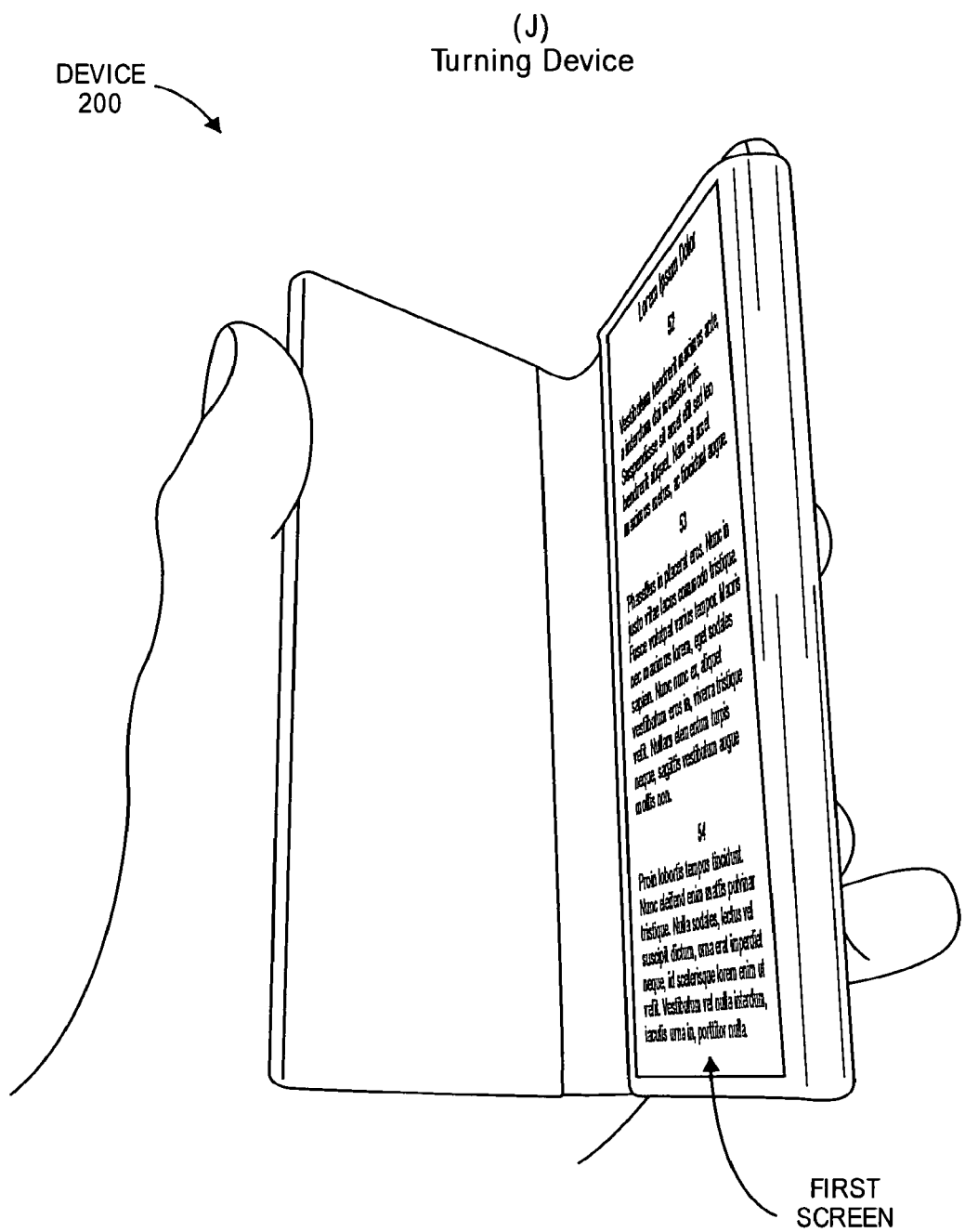

FIG. 2J: The device 200 is now being turned again, wherein the first screen section 252 will become nonvisible, and the section screen section 254 will again become visible.

After this rotation the mobile device will return to the original second (center) screen section 254, which will result in another page (a fourth page) to be displayed. In some embodiments, the process of moving forward in the text based on the turning of the device and the screen sections of the device may continue indefinitely. In some embodiments, sensors that may include, but are limited to, flap contact sensors, angle of opening sensors, light sensors, acceleration sensors, and gyroscope sensors can be used to establish the configuration changes as the reader flips the device.

Figure 3:
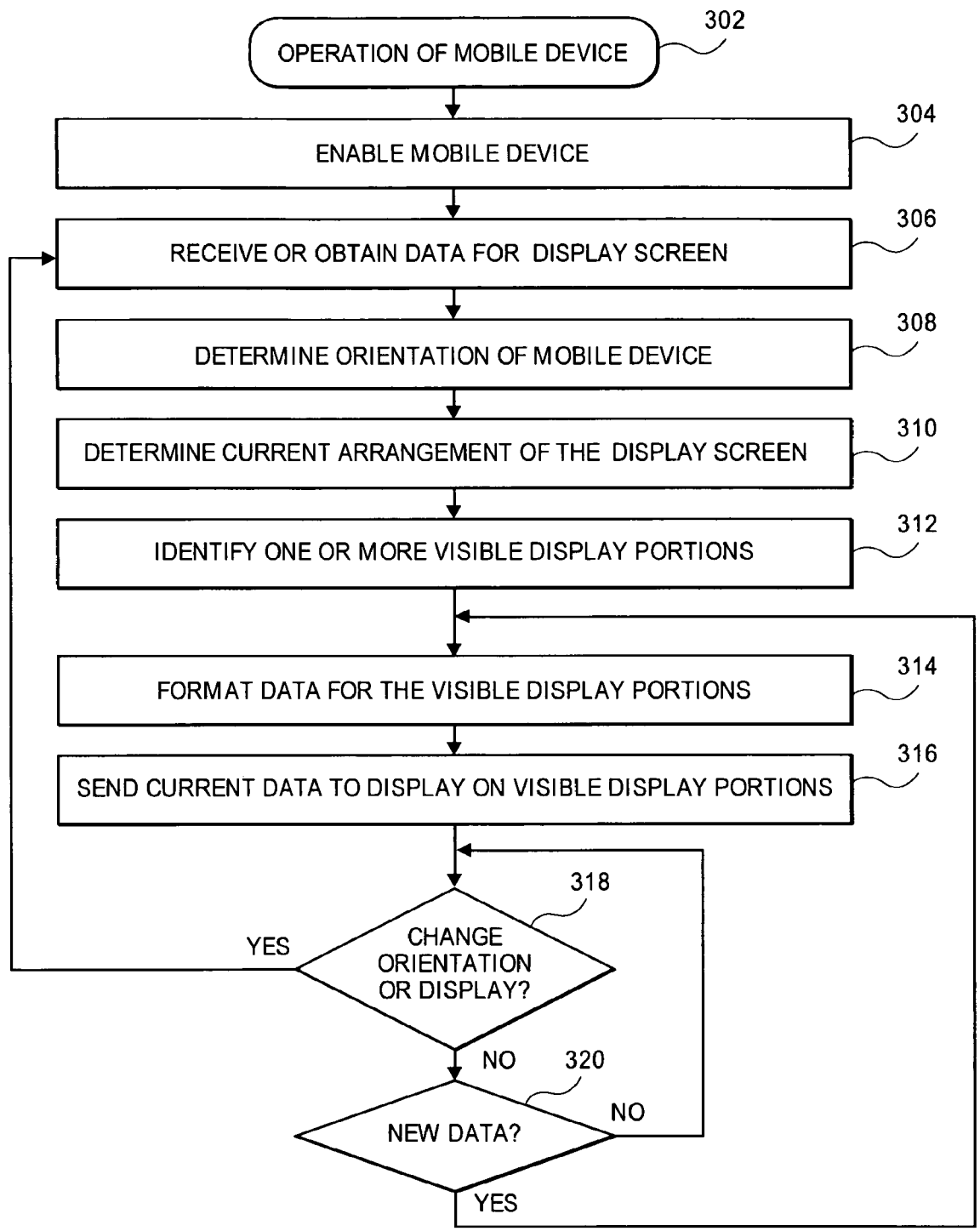
FIG. 3 is a flowchart to illustrate operation of a mobile device with a bendable and foldable display screen according to an embodiment.

FIG. 3 is a flowchart to illustrate operation of a mobile device with a bendable and foldable display according to an embodiment. The operation of the mobile device with a bendable and foldable display 302 may include the loading and running of an application, including, but not limited to, a reading application. Upon enabling the mobile device 304, in some embodiments the operation includes the mobile device receiving or obtaining certain data to be displayed on the bendable and foldable display 306.

In some embodiments, using sensor data from one or more device sensors and display sensors, the mobile device operates to determine an orientation of the mobile device 308 and a current arrangement of the display screen 310, wherein the arrangement includes in what manner the display screen is folded and what portions of the display screen are obscured from view by overlapping. In some embodiments, based on at least the determined device orientation and display screen arrangement, the mobile device is to identify one or more visible display portions 312, the visible display portions in general being display portions that are facing a user of the mobile device in operation and are not obscured by the device or other portions of the display screen.

In some embodiments, the device is to format data to be displayed on the one or more visible portions of the display screen 314, and to send data to the display screen for display on the one or more visible portions 316.

In some embodiments, based on sensor data, the mobile device is to determine whether there is a change in the device orientation or the arrangement of the display 318. If so, the process may return to receiving or obtaining new data for the display 306 (such as a new page of data in a reading application), followed by determining a new orientation of the mobile device 308 and determining a current arrangement of the display screen 310. If the orientation and arrangement has not changed 318, there may be determination whether there is new data to be displayed in the current orientation and display arrangement 320 (such as, for example, in an application in which the material being viewed includes animation or other changing data), in which case the process may return to formatting the data for the visible display portions 314.

Figure 4:
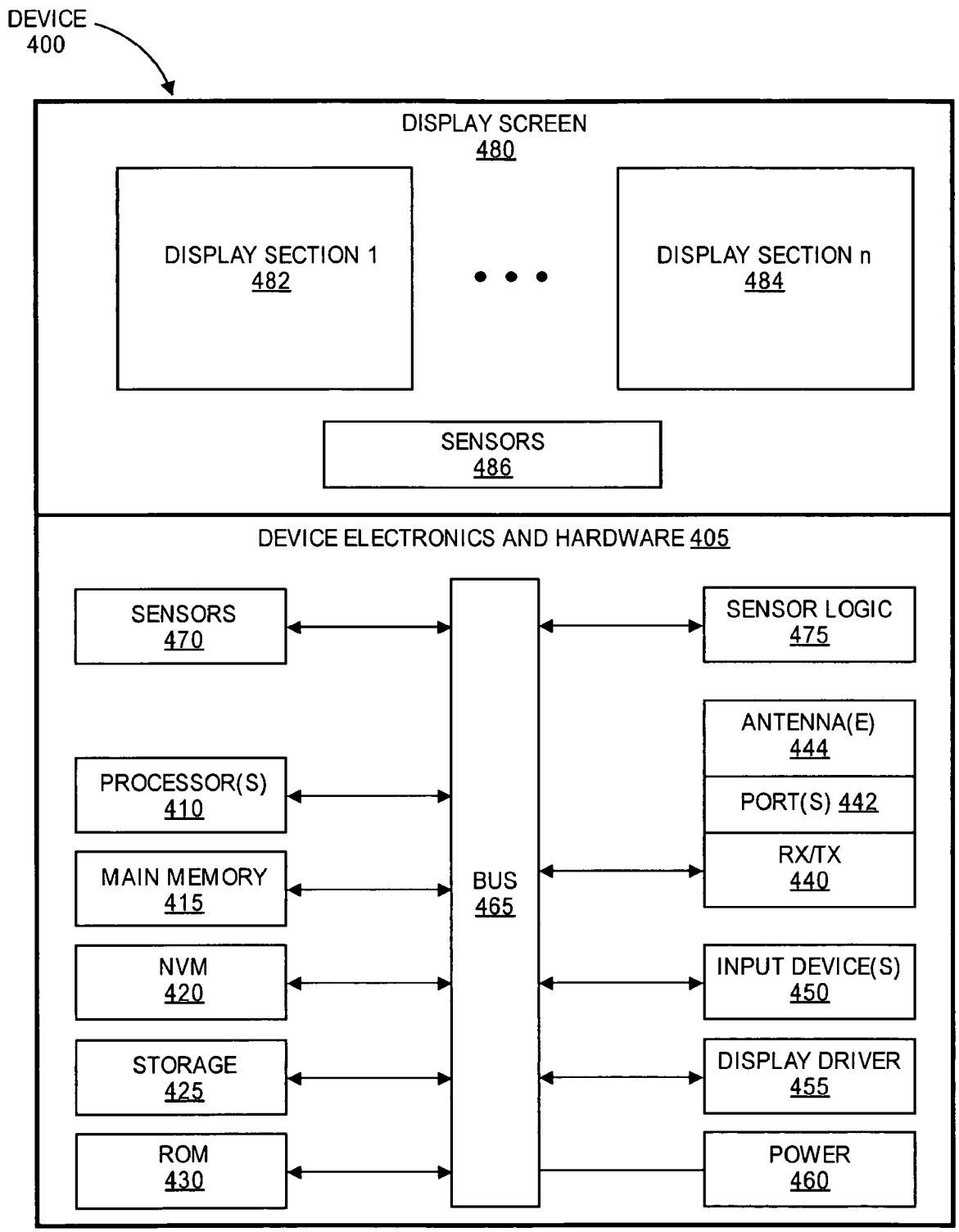
FIG. 4 is an illustration of an embodiment of a device including a bendable and foldable e display screen to provide continuous display according to an embodiment.

FIG. 4 is an illustration of an embodiment of a device including a bendable and foldable display according to an embodiment. In this illustration, certain standard and well-known components that are not germane to the present description are not shown. Elements shown as separate elements may be combined, including, for example, an SoC (System on Chip) combining multiple elements on a single chip.

In some embodiments, a device 400 includes a bendable and foldable display screen 480 and device electronics and hardware 405. In some embodiments, the display screen 480 may include multiple display sections, such as display section 1 (482) through display section n (484), and one or more sensors 486 to determine an arrangement of the display screen 480.

In some embodiments, the device electronics and hardware 405 include one or more sensors 470 including, but not limited to, sensors to determine a current orientation of the device 400. In some embodiments, the device electronics and hardware 405 further include logic 475 for interpretation of sensor data.

In some embodiments, the device electronics and hardware 405 may further include additional elements for operation, including the following:

In some embodiments, the device electronics and hardware 405 includes processing means such as one or more processors 410 coupled to one or more buses or interconnects, shown in general as bus 465. The processors 410 may comprise one or more physical processors and one or more logical processors. In some embodiments, the processors may include one or more general-purpose processors or special-processor processors. The bus 465 is a communication means for transmission of data. The bus 465 is illustrated as a single bus for simplicity, but may represent multiple different interconnects or buses and the component connections to such interconnects or buses may vary. The bus 465 shown in FIG. 4 is an abstraction that represents any one or more separate physical buses, point-to-point connections, or both connected by appropriate bridges, adapters, or controllers.

In some embodiments, the device electronics and hardware 405 further include a random access memory (RAM) or other dynamic storage device or element as a main memory 415 for storing information and instructions to be executed by the processors 410. Main memory 415 may include, but is not limited to, dynamic random access memory (DRAM).

The device electronics and hardware 405 also may comprise a non-volatile memory (NVM) 420; a storage device such as a solid state drive (SSD) or removable memory card 425; and a read only memory (ROM) 430 or other static storage device for storing static information and instructions for the processors 410.

In some embodiments, the device electronics and hardware 403 include one or more transmitters or receivers 440 coupled to the bus 465 to provide wired or wireless communications. In some embodiments, the device electronics 405 may include one or more antennae 444, such as dipole or monopole antennae, for the transmission and reception of data via wireless communication using a wireless transmitter, receiver, or both, and one or more ports 442 for the transmission and reception of data via wired communications. Wireless communication includes, but is not limited to, Wi-Fi, Bluetooth™, near field communication, and other wireless communication standards.

In some embodiments, the device electronics and hardware 405 include one or more input devices 450 for the input of data, including hard and soft buttons, a pointing device, a keyboard, voice command system, or gesture recognition system.

In some embodiments, the device electronics and hardware 403 include a display driver or other display or graphics electronics 455, where the display screen 480 may include a liquid crystal display (LCD), OLED (organic LED), or any other display technology, for displaying information or content to a user. In some environments, the display screen 480 may include a touch-screen that is also utilized as at least a part of an input device 450. The device electronics and hardware 405 may further include electronics and hardware for audio output, including one or more speakers, audio output jacks, or other audio, and other output to the user, which are not illustrated in FIG. 4.

The device electronics and hardware 405 may also comprise a battery or other power source 460, which may include a solar cell, a fuel cell, a charged capacitor, near field inductive coupling, or other system or device for providing or generating power in the device 400. The power provided by the power source 460 may be distributed as required to elements of the device 400.

In the description above, for the purposes of explanation, numerous specific details am set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

In some embodiments, a mobile device includes a processor to process data for the device; a bendable and foldable display screen; one or more device sensors to sense an orientation of the mobile device; and one or more display sensors to sense a current arrangement of the display screen. In some embodiments, wherein the processor is to identify one or more portions of the display screen that are visible to a user based at least in part on data from the one or more device sensors and the one or more display sensors.

In some embodiments, the processor is to format data for display on the one or more portions of the display screen that are visible to a user.

In some embodiments, the processor to identify the one or more visible portions of the display screen includes the processor to identify which portions of the display screen are facing towards the user and are not obscured by a body of the mobile device or other portions of the display screen.

In some embodiments, the processor is to sense a change in orientation of the mobile device or in arrangement of the display screen and, in response to the identified change in orientation or arrangement, the processor is to identify a new one or more portions of the display screen that are visible to a user.

In some embodiments, the processor, in response to the identified change in orientation or arrangement identifying the change in orientation, is further to provide new data for display on the new one or more visible portions of the display screen.

In some embodiments, the device is operable to provide a continuous display of new data as the display or portions of the display screen are turned over.

In some embodiments, the portions of the display screen are wrappable in relation to each other.

In some embodiments, the one or more portions of the display screen are flexible portions of the display screen.

In some embodiments, the one or more portions of the display screen are sections that operable to fold or hinge in relation to each other.

In some embodiments, one or more non-transitory computer-readable storage mediums having stored thereon data representing sequences of instructions that, when executed by one or more processors, cause the one or more processors to perform operations comprising: receiving sensor data from one or more sensors of a mobile device; based at least in part on the received sensor data, identifying one or more of a plurality of sections of a bendable and foldable display screen that are currently visible to a user; formatting data for display on the one or more visible sections of the display screen; and displaying the formatted data on the one or more visible sections of the display screen.

In some embodiments, the sensor data includes sensor data from one or more device sensors and sensor data from one or more display sensors.

In some embodiments, the instructions further include instructions for sensing an orientation of the mobile device based at least in part on the data from the one or more device sensors.

In some embodiments, the instructions further include instructions for sensing a current arrangement of the sections of the display screen based at least in part on the data from the one or more display sensors.

In some embodiments, the instructions further include instructions for providing a continuous display of new data as the display or portions of the display screen are turned over.

In some embodiments, wherein providing a continuous display of new data as the display or portions of the display screen are turned over includes providing succeeding data as the display or portions of the display screen are turned in a first direction and providing prior data as the display or portions of the display screen are turned in a first direction.

In some embodiments, wherein identifying one or more visible sections of the display screen includes identifying sections of the display screen are facing towards the user and are not obscured by a body of the mobile device or other portions of the display screen.

In some embodiments, a system includes a processor to process data for the device; a display screen including three or more display sections, the display sections being overlapping and foldable in relation to each other; one or more device sensors to sense an orientation of the mobile device; and one or more display sensors to sense a current arrangement of the display screen. In some embodiments, the processor is to identify one or more of the display sections that are currently visible to a user based at least in part on data from the one or more device sensors and the one or more display sensors; and the system is operable to provide a continuous display of new data as the display or portions of the display screen are turned over.

In some embodiments, the processor is to format data for display on the one or more display sections that are currently visible to a user.

In some embodiments, the processor to identify the one or more visible display sections includes the processor to identify which display screen sections are facing towards the user and are not obscured by the system or other section of the display screen.

In some embodiments, the provision of a continuous display of new data as the display or portions of the display screen are turned includes the processor, in response to a change in device orientation or display screen arrangement, providing new data for display on the new one or more visible section of the display screen.

In some embodiments, an apparatus includes means for receiving sensor data from one or more sensors of a mobile device; based at least in part on the received sensor data, means for identifying one or more of a plurality of sections of a bendable and foldable display screen that are currently visible to a user; means for formatting data for display on the one or more visible sections of the display screen; and means for displaying the formatted data on the one or more visible sections of the display screen.

In some embodiments, the sensor data includes sensor data from one or more device sensors and sensor data from one or more display sensors.

In some embodiments, the apparatus further includes means for sensing an orientation of the mobile device based at least in part on the data from the one or more device sensors.

In some embodiments, the apparatus further includes means for sensing a current arrangement of the sections of the display screen based at least in part on the data from the one or more display sensors.

In some embodiments, the apparatus further includes means for providing a continuous display of new data as the display or portions of the display screen are turned over.

In some embodiments, the means for providing a continuous display of new data as the display or portions of the display screen are turned over includes means for providing succeeding data as the display or portions of the display screen are turned in a first direction and providing prior data as the display or portions of the display screen are turned in a first direction.

In some embodiments, the means for identifying one or more visible sections of the display screen includes identifying sections of the display screen are facing towards the user and are not obscured by a body of the mobile device or other portions of the display screen.

What is claimed is:

1. A smartphone comprising:
    a housing moveable between a folded position and an unfolded position, the housing having a first side and a second side, the second side opposite the first side, the housing including a first housing portion, a second housing portion, a third housing portion, and a fourth housing portion, the first housing portion on the first side of the housing, the fourth housing portion on the second side of the housing opposite the first housing portion;
    a battery carried by the housing;
    a first display screen section supported by the first housing portion;
    a second display screen section supported by the third housing portion, the first housing portion to overlay at least a portion of the third housing portion when the housing is in the folded position, the second display screen section facing the fourth housing portion when the housing is in the folded position;
    a sensor carried by the housing, the sensor to output signals indicative of an orientation of the housing;
    machine readable instructions; and
    processor circuitry to execute the machine readable instructions to:
        cause content to be presented on the first display screen section when the housing is in the folded position; and
        cause content to be presented on the second display screen section when the housing is in the unfolded position.

2. The smartphone of claim 1, wherein the first housing portion is to pivot away from the third housing portion when the housing is moved from the folded position to the unfolded position.

3. The smartphone of claim 1, wherein the first housing portion defines a first exterior surface of the housing when the housing is in the folded position and the second housing portion defines a second exterior surface of the housing when the housing is in the folded position.

4. The smartphone of claim 1, wherein the first housing portion is to cover the second display screen section when the housing is in the folded position.

5. The smartphone of claim 1, wherein the processor circuitry is to cause the content on the first display screen section to be presented in a first orientation relative to the first housing portion and cause the content on the second display screen section to be presented in a same orientation as the first orientation.

6. The smartphone of claim 1, wherein the first display screen section and the second display screen section are touch-enabled.

7. The smartphone of claim 1, wherein the second display screen section does not present content when the housing is in the folded position.

8. The smartphone of claim 1, wherein the first housing portion is to overlay the portion of the third housing portion including the second display screen section when the housing is in the folded position.

9. A mobile electronic device comprising:
a housing including a hinge, the housing moveable between a folded position and an unfolded position via the hinge;
a first display portion supported by a first portion of the housing;
a second display portion supported by a second portion of the housing, the first display portion to overlay the second display portion when the housing is in the unfolded position, the second display portion facing a third portion of the housing opposite the first portion of the housing supporting the first display portion when the housing is in the folded position;
machine readable instructions; and
processor circuitry to execute the machine readable instructions to (a) cause the first display portion to switch from a first display state to a second display state when the housing moves from the folded position to the unfolded position, and (b) cause the second display portion to switch from the second display state to the first display state when the housing moves from the folded position to the unfolded position.

10. The mobile electronic device of claim 9, wherein the processor circuitry is to cause content to be presented on the first display portion when the first display portion is in the first display state.

11. The mobile electronic device of claim 9, wherein the second display portion does not present content in the second display state.

12. The mobile electronic device of claim 9, wherein the processor circuitry is to cause the first display portion to switch from the second display state to the first display state when the housing moves from the unfolded position to the folded position.

13. The mobile electronic device of claim 12, wherein the processor circuitry is to cause the second display portion to switch from the first display state to the second display state when the housing moves from the unfolded position to the folded position.

14. The mobile electronic device of claim 9, further including a sensor to output signals indicative of an orientation of at least a portion of the mobile electronic device.

15. The mobile electronic device of claim 9, wherein the first display portion and the second display portion are touch-enabled.

16. A smartphone comprising:
a first display screen section;
a second display screen section;
a housing including:
a first housing portion having a first side and a second side, the first side opposite the second side, the first side of the first housing portion supporting the first display screen section; and
a second housing portion to support the second display screen section, the first housing portion moveable between:
a first position in which the first housing portion is above at least a portion of the second housing portion when the smartphone is positioned in a horizontal plane, the first side of the first housing portion facing away from the second housing portion when the first housing portion is in the first position, and the at least the portion of the second housing portion facing the second side of the first housing portion when the first housing portion is in the first position, and
a second position in which the first housing portion is pivoted at least partially away from the second housing portion;
machine executable instructions; and
processor circuitry to execute the machine executable instructions to:
cause content to be presented on the first display screen section when the first housing portion is in the first position; and
cause content to be presented on the second display screen section when the first housing portion is in the second position.

17. The smartphone of claim 16, wherein the first display screen section extends along the first side of the first housing portion.

18. The smartphone of claim 16, wherein the first side of the first housing portion defines a first exterior surface of the housing when the first housing portion is in the first position.

19. The smartphone of claim 18, wherein the housing includes a third housing portion, the third housing portion defining a second exterior surface of the housing when the first housing portion is in the first position, the third housing portion facing away from the second housing portion when the first housing portion is in the first position.

20. The smartphone of claim 16, further including a battery carried by the housing.

21. The smartphone of claim 16, wherein the first housing portion is to cover the second display screen section when the first housing portion is in the first position.

* * * * *